United States Patent
Homma et al.

(10) Patent No.: US 7,320,118 B2
(45) Date of Patent: Jan. 15, 2008

(54) DELAY ANALYSIS DEVICE, DELAY ANALYSIS METHOD, AND COMPUTER PRODUCT

(75) Inventors: Katsumi Homma, Kawasaki (JP); Toshiyuki Shibuya, Kawasaki (JP); Hidetoshi Matsuoka, Kawasaki (JP); Izumi Nitta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 200 days.

(21) Appl. No.: 11/315,173

(22) Filed: Dec. 23, 2005

(65) Prior Publication Data

US 2007/0074138 A1   Mar. 29, 2007

(30) Foreign Application Priority Data

Sep. 26, 2005   (JP) ............... 2005-278763

(51) Int. Cl.
   *G06F 17/50*   (2006.01)
(52) U.S. Cl. ............... 716/6; 703/16
(58) Field of Classification Search ........... 716/6; 703/16
   See application file for complete search history.

(56) References Cited

U.S. PATENT DOCUMENTS 5,365,463 A * 11/1994 Donath et al. ............ 703/19
6,907,590 B1 * 6/2005 Al-Dabagh et al. ............ 716/6
7,086,023 B2 * 8/2006 Visweswariah ............ 716/6
2002/0104065 A1 * 8/2002 Tsukiyama et al. ............ 716/6
2004/0002844 A1 * 1/2004 Jess et al. ............ 703/14
2004/0025123 A1 * 2/2004 Angilivelil ............ 716/4
2005/0066298 A1 * 3/2005 Visweswariah ............ 716/6
2006/0112158 A1 * 5/2006 Tetelbaum ............ 708/490
2007/0033554 A1 * 2/2007 Tsukiyama et al. ............ 716/4
2007/0089074 A1 * 4/2007 Ramachandran et al. ............ 716/2
2007/0204248 A1 * 8/2007 Homma et al. ............ 716/6

FOREIGN PATENT DOCUMENTS

JP   07-334530   12/1995
JP   2004-252831   9/2004

* cited by examiner

*Primary Examiner*—Phallaka Kik
(74) *Attorney, Agent, or Firm*—Staas & Halsey LLP

(57) ABSTRACT

A delay analysis device includes a receiving unit that receives a result of a timing analysis of a target circuit to be analyzed, a detecting unit that detects critical paths having delays within a predetermined range, a statistical-delay computing unit that computes a statistical delay of the target circuit based on a cumulative probability distribution of the delays of the critical paths, and a probability-density-distribution computing unit that computes a probability density distribution of delay of a critical path that has the greatest delay in the result. The detecting unit detects x number of critical paths having cumulative delays within computed probability density distribution.

12 Claims, 14 Drawing Sheets

| CRITICAL PATH | CIRCUIT ELEMENT | AVERAGE DELAY [ps] | CUMULATIVE DELAY [ps] |
|---|---|---|---|
| CP1 | C1 | m1 | m1 |
| | C2 | m2 | m1+m2 |
| | C6 | m6 | m1+m2+m6 |
| | C7 | m7 | M1[=m1+m2+m6+m7] |
| CP2 | C8 | m8 | m8 |
| | C2 | m2 | m8+m2 |
| | C12 | m12 | m8+m2+m12 |
| | C13 | m13 | M2[=m8+m2+m12+m13] |
| CP3 | C14 | m14 | m14 |
| | C15 | m15 | m14+m15 |
| | C16 | m16 | m14+m15+m16 |
| | C13 | m13 | M3[=m14+m15+m16+m13] |
| CP4 | C17 | m17 | m17 |
| | C18 | m18 | m17+m18 |
| | C19 | m19 | m17+m18+m19 |
| | C20 | m20 | M4[=m17+m18+m19+m20] |
| ⋮ | ⋮ | ⋮ | ⋮ |
| CPx | ⋮ | ⋮ | Mx |
| ⋮ | ⋮ | ⋮ | ⋮ |
| CPz | ⋮ | ⋮ | Mz |

DELAY ANALYSIS DEVICE, DELAY ANALYSIS METHOD, AND COMPUTER PRODUCT

CROSS-REFERENCE TO RELATED APPLICATIONS

This application is based upon and claims the benefit of priority from the prior Japanese Patent Application No. 2005-278763, filed on Sep. 26, 2005, the entire contents of which are incorporated herein by reference.

BACKGROUND OF THE INVENTION

1. Field of the Invention

The present invention relates to a technology for analyzing delay occurring of a circuit.

2. Description of the Related Art

Recently, in very large scale integration (VLSI) manufacturing, influence of statistical factors, for example, of process variation, is increasing due to fragmentation of processes. A technology for decreasing delay considering the influence of statistical factors is required in VLSI designing to obtain high yield in creating circuits that have required performance. Conventionally, a statistical delay analysis method is developed that considers process variation and eliminates unnecessary delay margin (for example, Japanese Patent Laid-Open Publication No. 2004-252831). Furthermore, a delay minimizing device is developed that minimizes delay of a logic circuit (for example, Japanese Patent Laid-Open Publication No. H7-334530).

However, in the conventional technology, it is difficult to accurately deal with statistical factors. For example, when dealing with statistical factors in a conventional static timing analysis (STA), values of the statistical factors are estimated based on the worst case scenario, thereby resulting in unrealistic and inaccurate values of circuit delay. This leads to a repetition of circuit designing, thereby increasing the burden on a designer, and causing further delay in designing time.

Carrying out a delay analysis of all paths in a chip by using such conventional technology greatly increases the processing time of the delay analysis, thereby further increasing the designing time. In the above conventional technology, circuit delay is minimized at a logical level called partial collapsing. Thus, circuit delay is minimized without carrying out a timing analysis. In other words, because circuit delay is minimized without considering a delay of critical paths, an accurate circuit delay cannot be estimated.

SUMMARY OF THE INVENTION

It is an object of the present invention to at least solve the problems in the conventional technology.

A computer-readable recording medium according to one aspect of the present invention stores therein a computer program for analyzing circuit delay. The computer program makes a computer execute receiving a result of a timing analysis of a target circuit to be analyzed; detecting, based on the result, critical paths having delays within a predetermined range; and computing a statistical delay of the target circuit based on a cumulative probability distribution of the delays of the critical paths.

A delay analysis device according to another aspect of the present invention is for analyzing circuit delay. The delay analysis device includes a receiving unit configured to receive a result of a timing analysis of a target circuit to be analyzed; a detecting unit configured to detect, based on the result, critical paths having delays within a predetermined range; and a statistical-delay computing unit configured to compute a statistical delay of the target circuit based on a cumulative probability distribution of the delays of the critical paths.

A delay analysis method according to still another aspect of the present invention is of analyzing circuit delay. The delay analysis method includes receiving a result of a timing analysis of a target circuit to be analyzed; detecting, based on the result, critical paths having delays within a predetermined range; and computing a statistical delay of the target circuit based on a cumulative probability distribution of the delays of the critical paths.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 4 is a schematic of a timing list according to the embodiment;

DETAILED DESCRIPTION OF THE PREFERRED EMBODIMENTS

Exemplary embodiments of the present invention will be explained below with reference to accompanying drawings.

Figure 1:
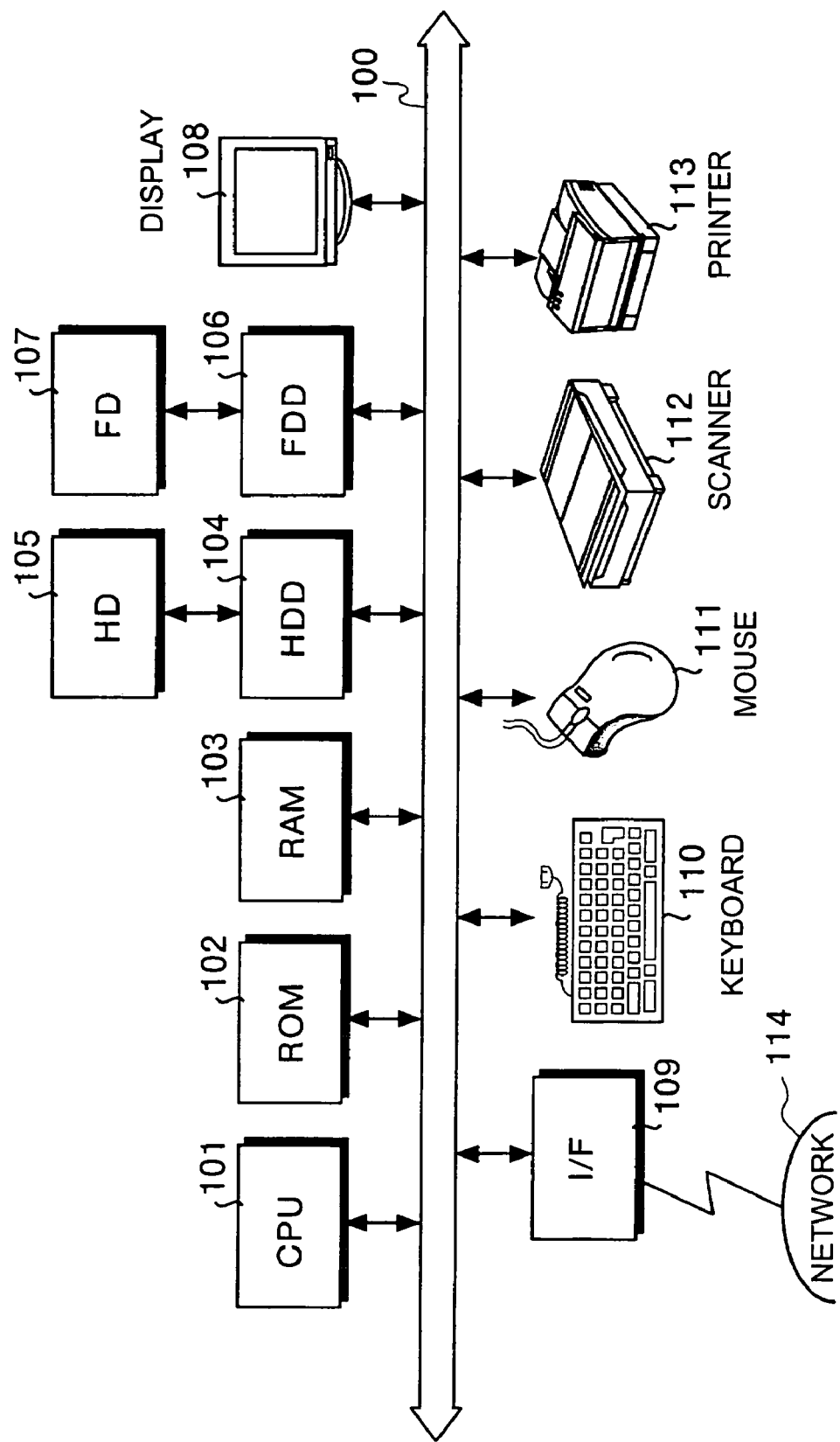
FIG. 1 is a schematic of a delay analysis device according to an embodiment of the present invention.

FIG. 1 is a schematic of a delay analysis device according to an embodiment of the present invention. As shown in FIG. 1, the delay analysis device includes a central processing unit (CPU) 101, a read only memory (ROM) 102, a random access memory (RAM) 103, a hard disk drive (HDD) 104, a hard disk (HD) 105, a flexible disk drive (FDD) 106, a flexible disk (FD) 107 as an example of a removable recording medium, a display 108, an interface 109, a keyboard 110, a mouse 111, a scanner 112, and a printer 113. Paths 100 connect each component.

The CPU 101 controls the entire delay analysis device. The ROM 102 stores programs such as a boot program. The RAM 103 is used as a work area of the CPU 101. The HDD 104 controls reading of data from and writing of data to the HD 105 according to the control exercised by the CPU 101. The HD 105 stores data that is written as a result of control exercised by the HDD 104.

The FDD 106 controls reading of data from and writing of data to the FD 107 according to the control exercised by the CPU 101. The FD 107 stores data that is written as a result of control exercised by the FDD 106 and causes the delay analysis device to read the data that is stored in the FD 107.

Apart from the FD 107, a compact disk-read only memory (CD-ROM) (compact disk-recordable (CD-R), compact disk-rewriteable (CD-RW)), a magneto optical (MO) disk, a digital versatile disk (DVD), and a memory card can also be used as a removable recording medium. The display 108 displays a cursor, an icon, or a toolbox as well as data such as text, images, and function data. A cathode ray tube (CRT), a thin film transistor (TFT) liquid crystal display, and a plasma display can also be used as the display 108.

The interface 109 is connected to a network 114 such as the Internet via communication lines. The interface 109 is connected to other devices via the network 114. The interface 109 controls input and output of data towards external devices via the network 114 and an internal interface. A modem or a Local Area Network (LAN) adapter can be used as the interface 109.

The keyboard 110 carries out input of data by using keys that are provided for inputting text, numerals, and various types of instructions. A touch panel type input pad or a numeric keypad can also be used as the keyboard 110. The mouse 111 moves the cursor, selects cursor range, moves a window, and changes window size. A trackball or a joystick provided with similar functions can also be used as a pointing device.

The scanner 112 optically reads an image and fetches image data into the delay analysis device. The scanner 112 can also be provided with an optical character recognition (OCR) function. The printer 113 prints image data or text data. A laser printer or an inkjet printer can also be used as the printer 113.

Figure 2:
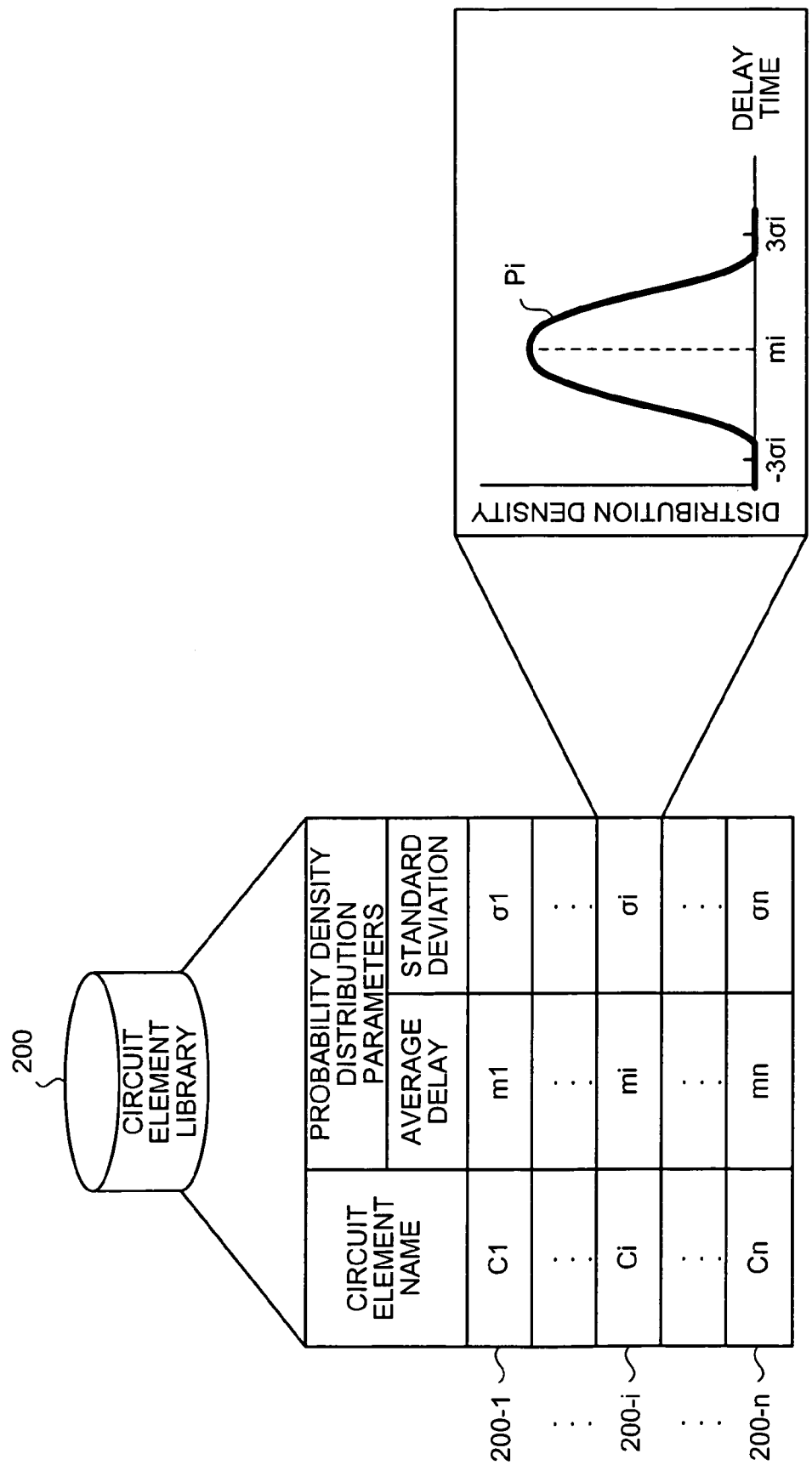
FIG. 2 is a schematic for illustrating contents stored in a circuit element library.

FIG. 2 is a schematic for illustrating contents stored in a circuit element library 200. The circuit element library 200 stores circuit-element-delay distribution data 200-1 through 200-n for each circuit element. The circuit-element-delay distribution data 200-1 through 200-n include a circuit element name and probability density distribution parameters related to clock delay for each circuit element.

The probability density distribution parameters related to clock delay include average delay and standard deviation of the circuit element. For example, a circuit element Ci has average delay $m_i$, a standard deviation $\sigma_i$, and a probability density distribution Pi as a distribution function. The circuit elements include a buffer, an inverter, and a logic gate.

Figure 3A:
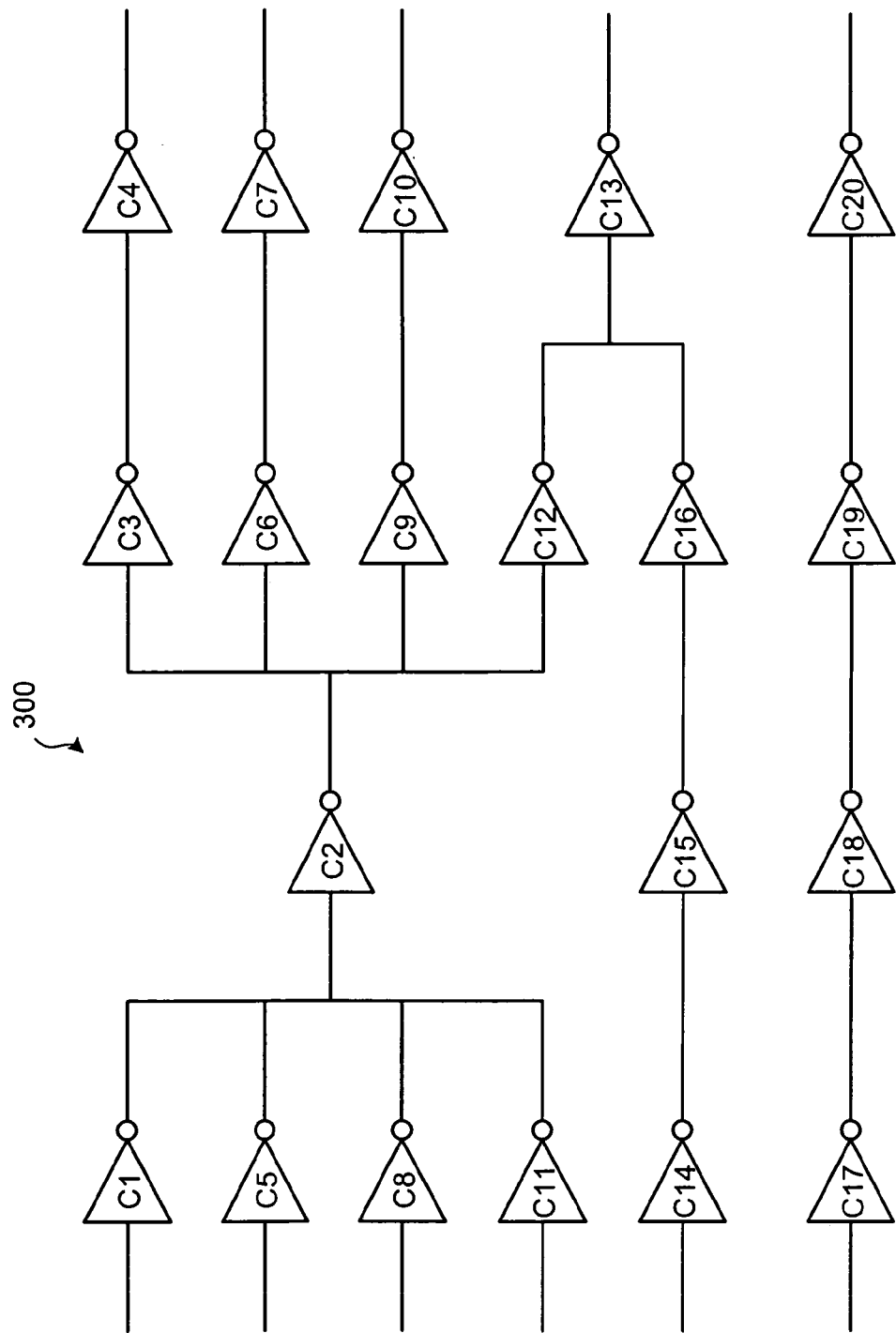
FIG. 3A is a schematic of a target circuit to be analyzed according to the embodiment.

FIG. 3A is a schematic of a target circuit 300 to be analyzed according to the embodiment. A part of the target circuit 300 is extracted and displayed as shown in FIG. 3A. The target circuit 300 shown in FIG. 3A includes circuit elements C1 through C20.

Figure 3B:
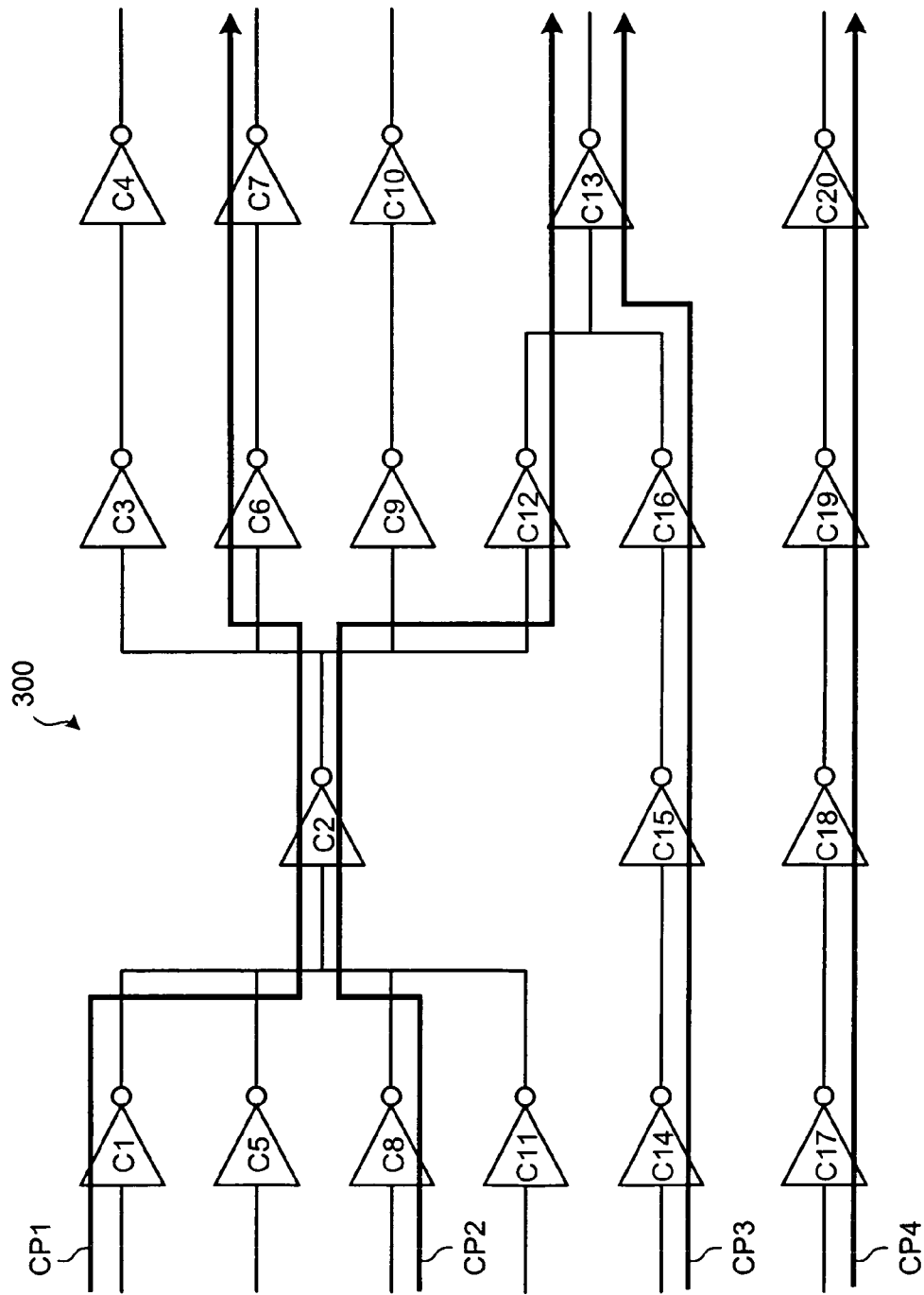
FIG. 3B is a schematic of critical paths that are detected based on a result of a timing analysis on the target circuit.

FIG. 3B is a schematic of critical paths that are detected based on a timing analysis result of the target circuit 300. As shown in FIG. 3B, four critical paths CP1 through CP4 are detected based on the timing analysis result of the target circuit 300.

The critical path CP1 passes through the circuit elements C1, C2, C3, and C7. The critical path CP2 passes through the circuit elements C8, C2, C12, and C13. The critical path CP3 passes through the circuit elements C14, C15, C16, and C13. The critical path CP4 passes through the circuit elements C17, C18, C19, and C20.

FIG. 4 is a schematic of a timing list 400 that is the timing analysis result. The timing list 400 shown in FIG. 4 is created as a result of the timing analysis (STA) of the target circuit 300. For each of the circuit paths CP1 through CPz, the timing list 400 includes a description of the circuit elements forming the circuit path, average delay of the circuit elements, and cumulative delay.

For example, the critical path CP1 includes the circuit elements C1, C2, C6, and C7. The circuit element library 200 shown in FIG. 2 is used for the timing analysis. Average delays of the circuit elements C1, C2, C6, and C7 are m1, m2, m6, and m7 respectively.

The cumulative delay of a circuit element is a total of average delays until the circuit element. In the critical paths CP1 through CPz, the cumulative delays of the last circuit element are average delays M1 through Mz of the critical paths CP1 through CPz respectively. For example, the average delay M1, which is a total of the cumulative delays of the critical path CP1 is equal to the total of delays until the last circuit element C7 (m1+m2+m6+m7).

Figure 5:
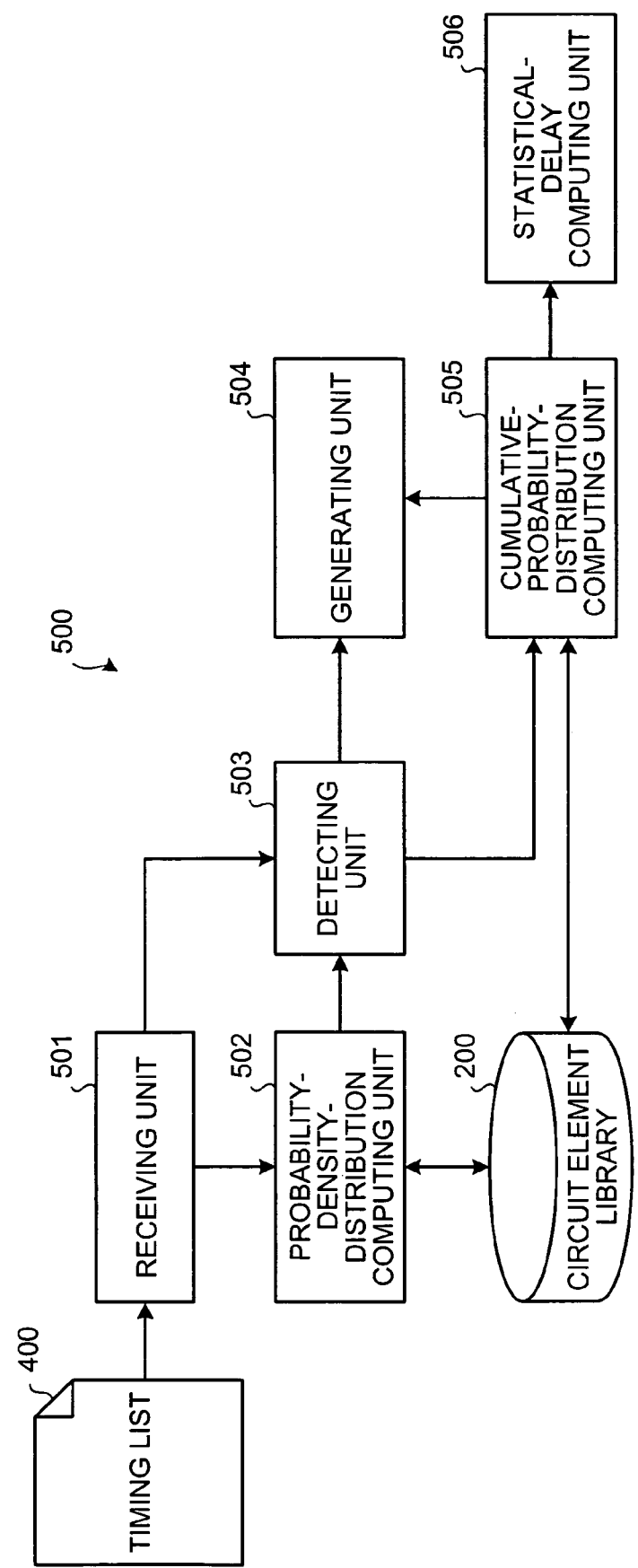
FIG. 5 is a block diagram of the delay analysis device.

FIG. 5 is a block diagram of a delay analysis device 500 according to the embodiment of the present invention. As shown in FIG. 5, the delay analysis device 500 includes a receiving unit 501, a probability-density-distribution computing unit 502, a detecting unit 503, a generating unit 504, a cumulative-probability-distribution computing unit 505, and a statistical-delay computing unit 506.

The receiving unit 501 receives an input of the timing analysis result of the target circuit 300. Specifically, the receiving unit 501 receives, for example, the timing list 400 shown in FIG. 4. The timing analysis result (the timing list 400) received is output to the probability-density-distribution computing unit 502 or to the detecting unit 503.

The probability-density-distribution computing unit 502 computes a probability density distribution of delay of the critical path having the greatest delay in the timing analysis result. Specifically, the probability-density-distribution computing unit 502 computes, for example, the probability density distribution of delay of the critical path having the greatest cumulative delay among the cumulative delays M1 through Mz from the timing list 400 received by the receiving unit 501. If the cumulative delays M1 through Mz from the timing list 400 are sorted according to the length of time, because the cumulative delay M1 of the critical path CP1 is the greatest, the probability-density-distribution computing unit 502 computes the probability density distribution of delay of the critical path CP1.

A method to compute the probability density distribution is explained next by taking the critical path CP1 as an example. When computing the probability density distribution, the probability-density-distribution computing unit 502 refers to the circuit element library 200. Because the critical path CP1 includes the circuit elements C1, C2, C6, and C7, the probability-density-distribution computing unit 502 computes a standard deviation $\sigma$ of the critical path CP1 from the standard deviations $\sigma 1$, $\sigma 2$, $\sigma 6$, and $\sigma 7$ of the circuit elements C1, C2, C6, and C7 respectively by using Equation 1.

$$\sigma = \sqrt{\sigma 1^2 + \sigma 2^2 + \sigma 6^2 + \sigma 7^2} \tag{1}$$

Figure 6:
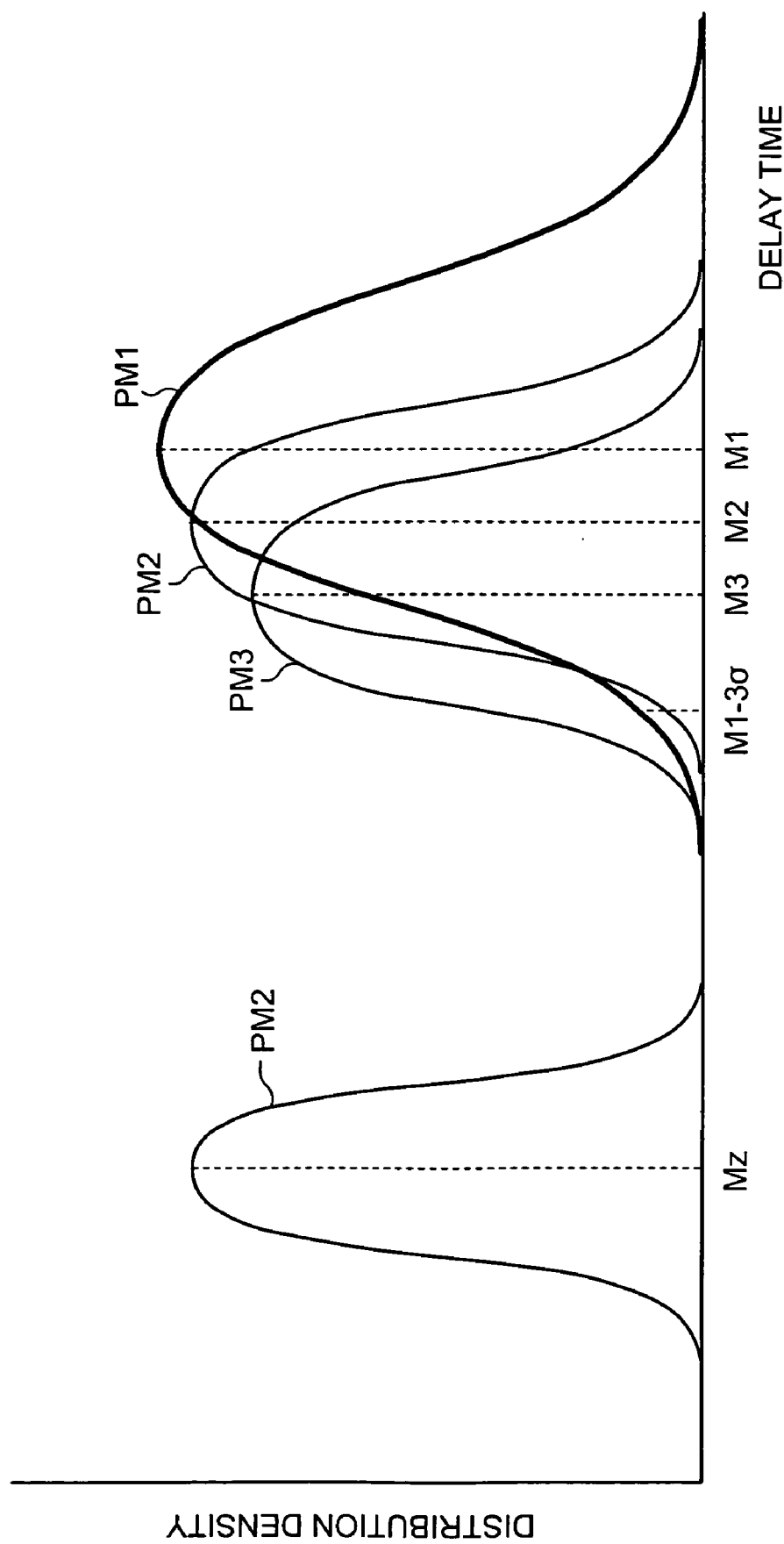
FIG. 6 is a graph of a probability density distribution of delay.

A probability density distribution PM1 of delay of the critical path CP1 having the greatest cumulative delay can be computed from the average delay M1 and the standard deviation σ. FIG. 6 is a graph of the probability density distribution of delay. As shown in FIG. 6, the probability density distribution PM1 of delay of the critical path CP1 is represented as a normal distribution consisting of the average delay M1 and the standard deviation σ.

Based on the timing analysis result received by the receiving unit 501, the detecting unit 503 detects the critical paths having delays within a predetermined range. Specifically, based on the probability density distribution PM1 that is computed by the probability-density-distribution computing unit 502, for example, the detecting unit 503 detects the critical paths having (average) delays within the predetermined range.

Specifically, as shown in FIG. 6, the detecting unit 503 detects the critical paths CP2 and CP3, having the average delays M2 and M3 respectively, within the range of the probability density distribution PM1 such that the probability density distribution PM1 is between (M1−3σ) and the average delay M1. Probability density distributions PM2 and PM3 of the critical paths CP2 and CP3 respectively are shown in FIG. 6. Moreover, a probability density distribution PMz of the critical path CPz having the average delay Mz that is less than (M1−3σ) of the probability density distribution PM1 is also shown in FIG. 6.

According to logical estimation, even if the target circuit 300 includes one hundred thousand critical paths having cumulative delays that are less than (M1−3σ) of the probability density distribution PM1, the delay of the entire target circuit 300 is affected by less than one percent. Due to this, the influence of statistical factors can be determined by analyzing only the critical paths having average delays within the range of the probability density distribution PM1 such that the probability density distribution PM1 is between (M1−3σ) and the average delay M1.

If the probability density distribution PM1 is not computed by the probability-density-distribution computing unit 502, based on the timing analysis result, the detecting unit 503 detects a predetermined number of critical paths in the descending order of delays beginning from the critical path having the greatest cumulative delay. Specifically, if the target circuit 300 of 0.11μ includes 150,000 critical paths, approximately first 900 critical paths in the timing list 400 (equivalent to 0.6 percent of the total) are included in the range (M1−3σ) of the probability density distribution PM1. Thus, restricting the number of critical paths to first x number of critical paths enables to enhance the speed of the delay analyzing process by a hundred times.

Figure 7:
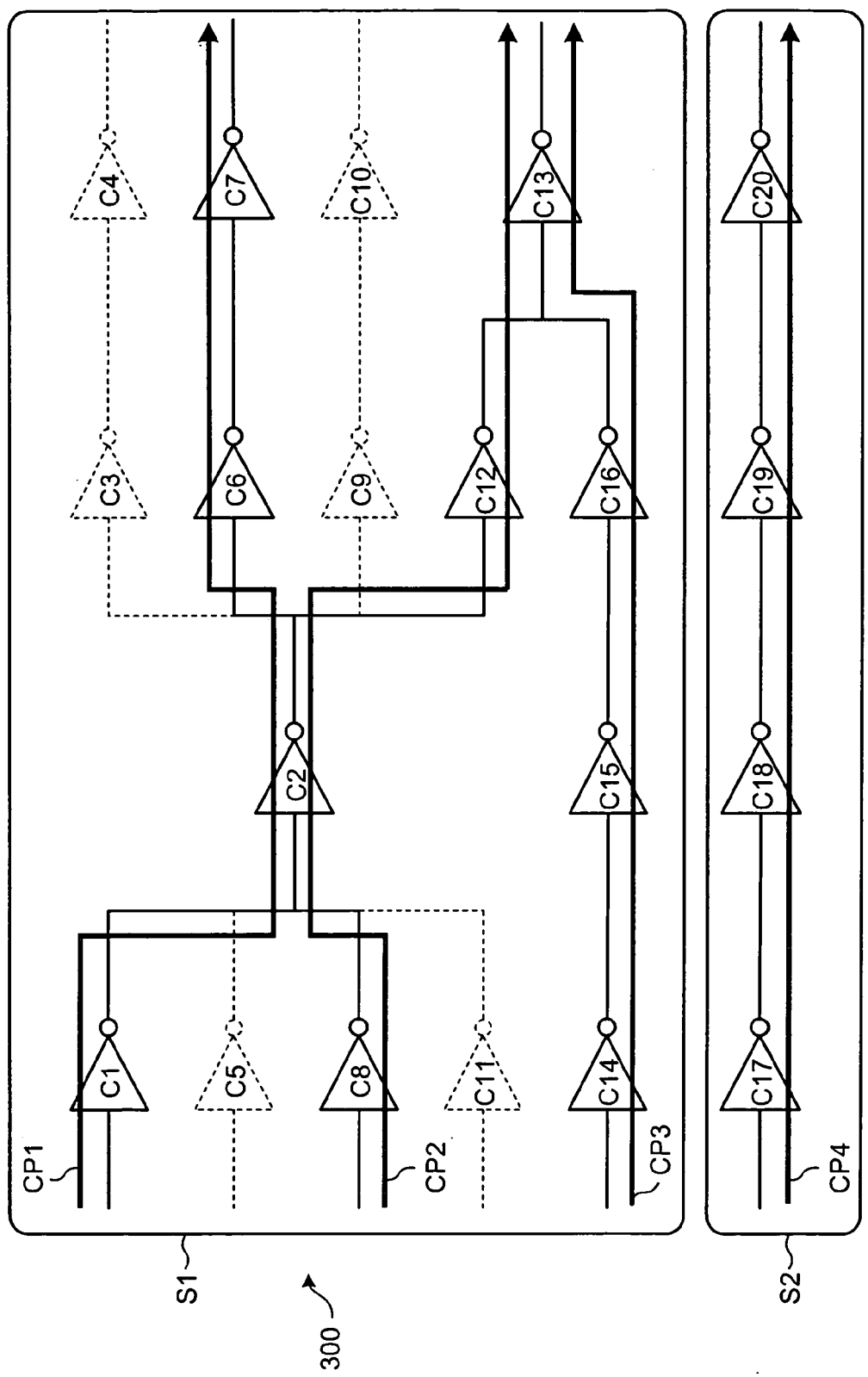
FIG. 7 is a schematic of partial circuits according to the embodiment.

Among the circuit paths that are detected by the detecting unit 503, the generating unit 504 searches the circuit paths which share the circuit elements that form the target circuit 300 and generates partial circuits that form a part of the target circuit 300. FIG. 7 is a schematic of the partial circuits according to the embodiment of the present invention. As shown in FIG. 7, the target circuit 300 includes partial circuits S1 and S2.

The critical path CP1 includes the circuit elements C1, C2, C6, and C7. The generating unit 504 searches the critical path CP2 that shares the circuit element C2. The critical path CP2 includes the circuit elements C8, C2, C12, and C13. The generating unit 504 searches the critical path CP3 that shares the circuit element C13. In other words, the critical paths CP1 and CP2 share the circuit element C2. Similarly, the critical paths CP2 and CP3 share the circuit element C13. Although the critical path CP1 and the critical path CP3 do not share a circuit element, because the critical paths CP1 and CP3 are indirectly related via the critical path CP2, a circuit that includes the critical paths CP1 through CP3 forms the partial circuit SP1. The circuit elements C3 through C5, C9 through C11 are not included in the partial circuit S1.

Although the critical path CP4 includes the circuit elements C17 through C20, because of non existence of a critical path that shares the circuit elements C17 through C20 with the critical path CP4, the critical path CP4 forms the partial circuit S2 by itself.

Figure 8:
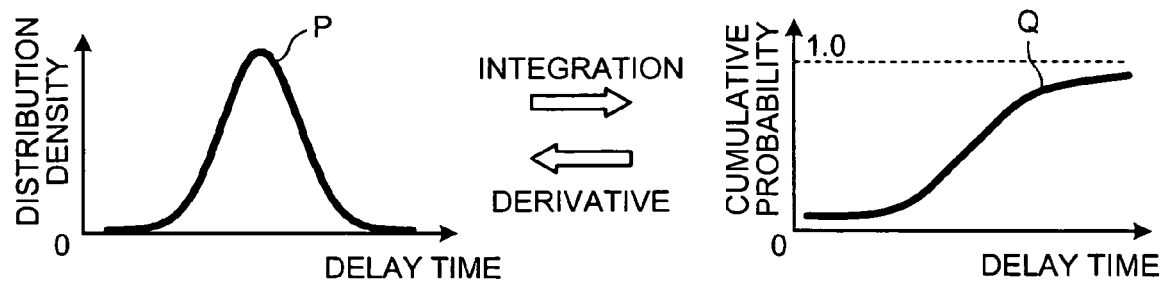
FIG. 8 is a schematic of the probability density distribution and a cumulative probability distribution of delay.

The cumulative-probability-distribution computing unit 505 computes a cumulative probability distribution of delay for each partial circuit that is generated by the generating unit 504. FIG. 8 is a schematic of the probability density distribution and the cumulative probability distribution of delay. As shown in FIG. 8, a probability density distribution P of delay is integrated to get a cumulative probability distribution Q.

Definitions of "statistical sum (symbol: *)" and "cumulative distribution product (symbol x)" are explained next. For sake of convenience, the definitions are explained by using two delay distributions a and b. The delay distribution a is represented as a probability density function by a probability density distribution Pa. The delay distribution b is represented as a probability density function by a probability density distribution Pb. The delay distribution a is represented as a cumulative probability function by a cumulative probability distribution Qa. The delay distribution b is represented as a cumulative probability function by a cumulative probability distribution Qb.

The statistical sum of the probability density distributions Pa and Pb can be represented by using the following Equation 2.

$$(Pa*Pb)(t) = \int_{\infty}^{\infty} dx Pa(t-x) \cdot Pb(x) \quad (2)$$

The statistical sum of the cumulative probability distributions Qa and Qb can be expressed as:

$$(Qa*Qb)(t) = \int_{\infty}^{\infty} dx Qa(t-x) \cdot Pb(x) \quad (3)$$

The cumulative distribution product of the probability density distributions Pa and Pb can be expressed as:

$$(Pa \times Pb)(t) = Pa(t) \cdot Qb(t) + Pb(t) \cdot Qa(t) \quad (4)$$

The cumulative distribution product of the cumulative probability distributions Qa and Qb can be expressed as:

$$(Qa \times Qb)(t) = Qa(t) \cdot Qb(t) \quad (5)$$

Specifically, the cumulative-probability-distribution computing unit 505 computes the probability density distribution of delay of each circuit element in the partial circuits. The cumulative-probability-distribution computing unit 505 computes the statistical sum (Equation 2) of the probability density distribution of delay of the circuit elements if the circuit elements are serial, thereby computing the probability density distribution of delay of the serial points. The cumulative-probability-distribution computing unit 505 computes the cumulative distribution product (Equation 4) of the probability density distribution of delay of the circuit elements if the circuit elements are parallel, thereby computing the cumulative distribution product of the parallel points.

The partial circuit S1 includes the circuit element C2 that is shared by the critical paths CP1 and CP2. The partial circuit S1 also includes the circuit element C13 that is shared by the critical path CP2 and the critical path CP3.

Because the circuit elements C1 and C8 are parallel, the cumulative probability distribution of delay of the circuit element C2 can be expressed as Equation 2 and Equation 4 (see Equation 6 below). Q1 indicates the cumulative probability distribution of delay of the circuit element C1, Q2 indicates the cumulative probability distribution of delay of the circuit element C2, and Q8 indicates the cumulative probability distribution of delay of the circuit element C8.

$$(Q1 \times Q8) * Q2 \qquad (6)$$

Because the circuit elements C14 through C16 are serial, the cumulative probability distribution of delay of the circuit element C13 can be expressed as Equation 2 (see Expression 7. Q14 indicates the cumulative probability distribution of delay of the circuit element C14, Q15 indicates the cumulative probability distribution of delay of the circuit element C15, and Q16 indicates the cumulative probability distribution of delay of the circuit element C16.

$$Q14 * Q15 * Q16 \qquad (7)$$

Thus, a cumulative probability distribution QS1 of delay of the partial circuit S1 can be expressed as Equation 8 below. P1, P2, P6 through P8, and P12 through P16 are probability density distributions of delays of the circuit elements C1, C2, C6 through C8, and C12 through C16 respectively.

$$QS1(t) = \qquad (8)$$
$$\int_{-\infty}^{\infty} dx \int_{-\infty}^{\infty} dy [(P1 \times P8) * P2](x) \cdot (Q14 * Q15 * Q16)(t-y) \cdot$$
$$Q12(t-x-y) \cdot (Q6 * Q7)(t-x) \cdot P13(y)$$

Based on Equation 8, it is possible to apply the cumulative distribution product for the probability density distributions of the circuit elements around the shared circuit elements C2 and C13, thereby simplifying the computation process and speeding up the computation process.

Because the partial circuit S2 does not include any shared circuit elements, a cumulative probability distribution QS2 of delay of the partial circuit S2 can be represented by using the following Equation 9. Q17 through Q20 are cumulative probability distributions of delays of the circuit elements C17 through C20 respectively.

$$QS2 = Q17 * Q18 * Q19 * Q20 \qquad (9)$$

Based on the cumulative probability distributions of delays of the critical paths that are detected by the detecting unit 503, the statistical-delay computing unit 506 computes a statistical delay related to the target circuit 300. Specifically, based on the cumulative probability distributions, which are computed by the cumulative-probability-distribution computing unit 505, of the partial circuits, the statistical-delay computing unit 506 computes the statistical delay related to the target circuit 300.

Figure 9:
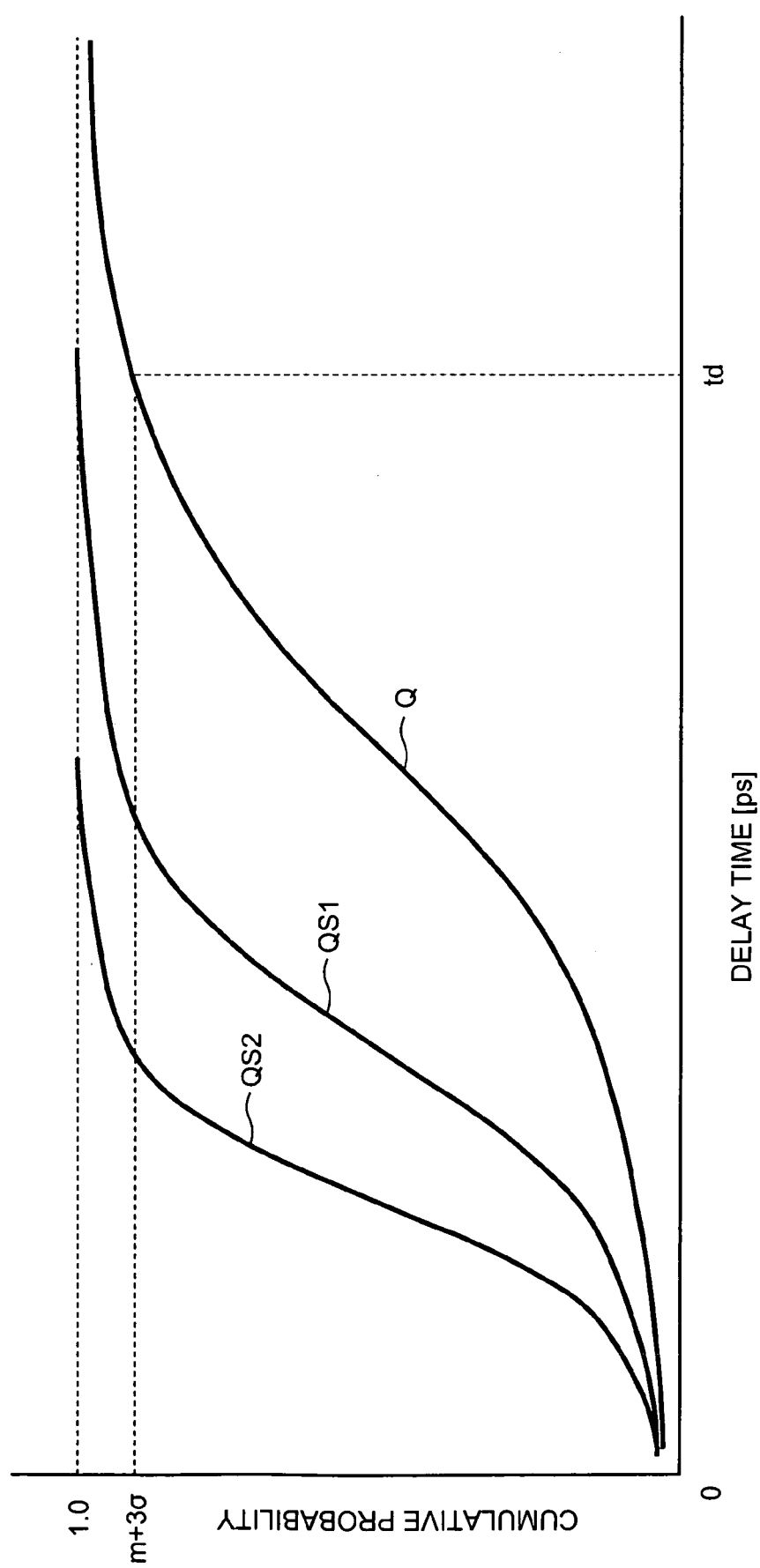
FIG. 9 is a graph of the cumulative probability distribution.

FIG. 9 is a graph of the cumulative probability distribution. Based on Equation 5, a cumulative probability distribution Q related to the target circuit 300 can be represented by using the cumulative probability distribution QS1 of delay of the partial circuit S1 and the cumulative probability distribution QS2 of delay of the partial circuit QS2 according to the following Equation 10.

$$Q = QS1 \times QS2 \qquad (10)$$

Based on the cumulative probability distribution Q related to the target circuit 300, the statistical-delay computing unit 506 computes the statistical delay related to the target circuit 300. For example, if m indicates average delay and σ indicates standard deviation in the cumulative probability distribution Q, the statistical delay of m+3σ (99.86 percent) is indicated by td as shown in FIG. 9.

The functions of the receiving unit 501, the probability-density-distribution computing unit 502, the detecting unit 503, the generating unit 504, the cumulative-probability-distribution computing unit 505, and the statistical-delay computing unit 506 can be realized, for example, by using a computer program that is recorded in a recording medium such as the ROM 102, the RAM 103, and the HD 105 shown in FIG. 1, and causing the CPU 101 to execute the computer program. The computer program can also be executed by using the interface 109.

Figure 10:
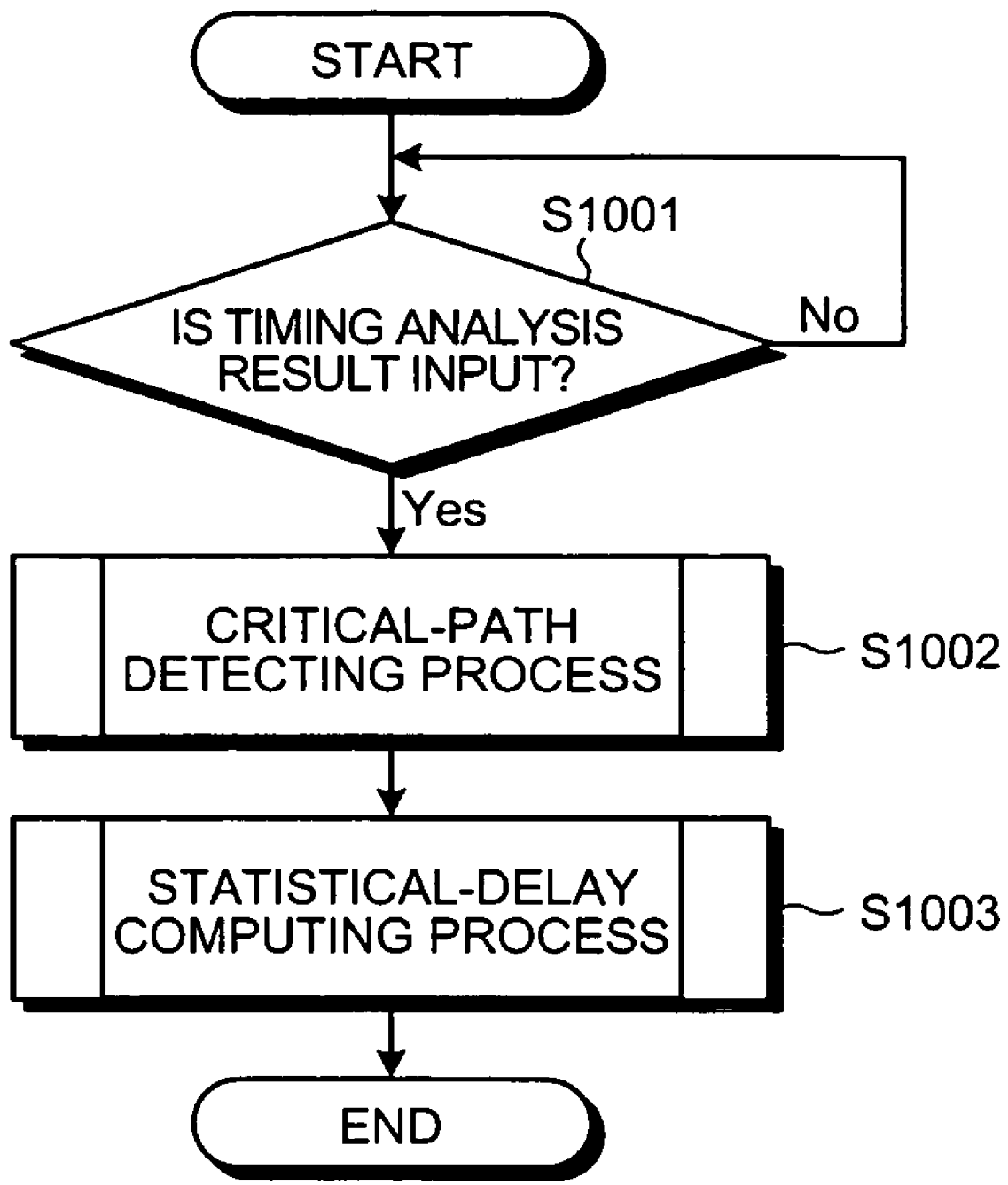
FIG. 10 is a flowchart of a delay analyzing process in the delay analysis device.

FIG. 10 is a flowchart of a delay analyzing process in the delay analysis device 500. As shown in FIG. 10, the receiving unit 501 awaits input of the timing analysis result ("NO" at step S1001). Upon receiving the timing analysis result ("YES" at step S1001), the detecting unit 503 executes a critical-path detecting process (step S1002). Next, the statistical-delay computing unit 506 executes a statistical-delay computing process (step S1003), thereby completing a series of the delay analyzing process.

Figure 11:
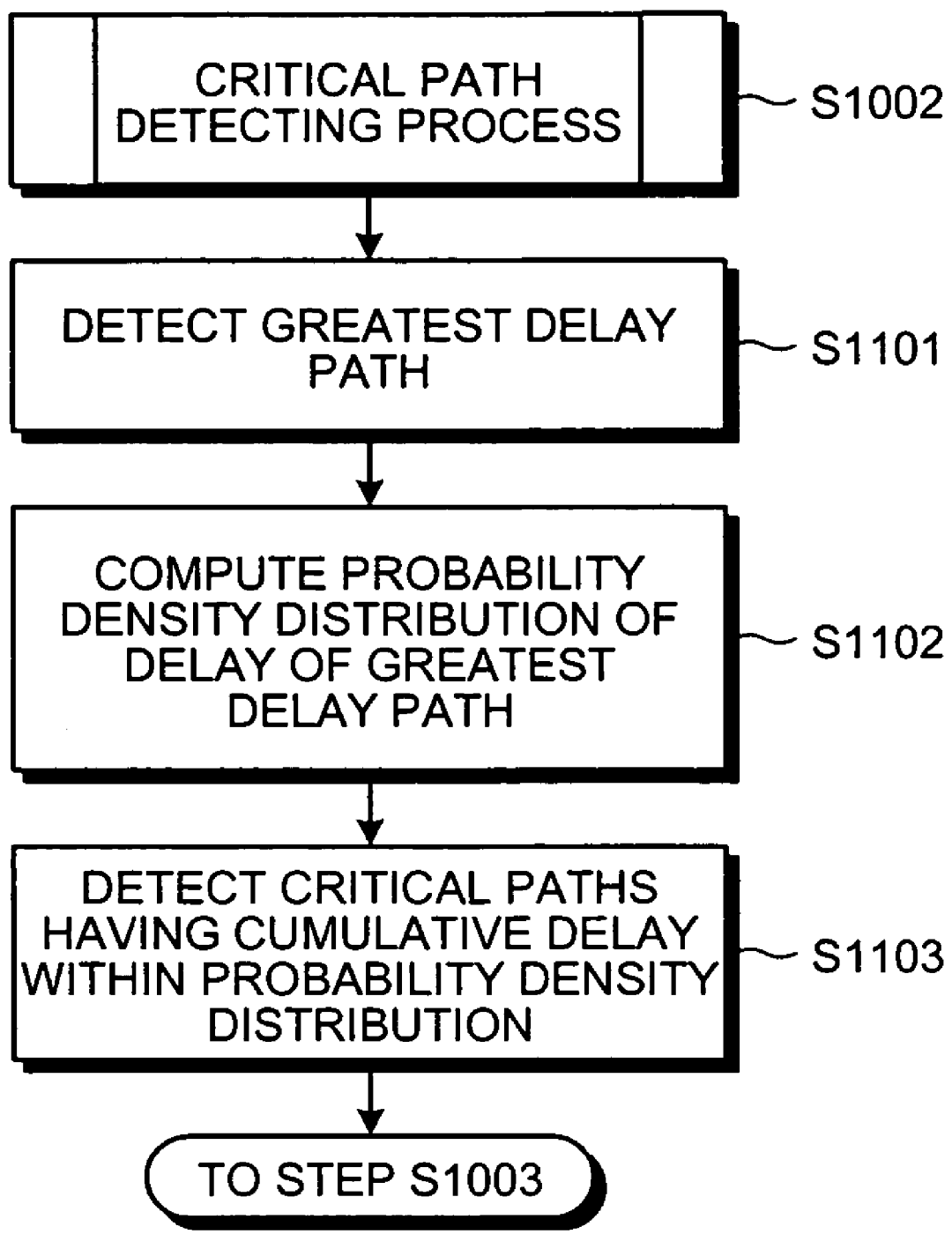
FIG. 11 is a flowchart of a critical-path detecting process in the delay analysis device.

FIG. 11 is a flowchart of the critical-path detecting process. As shown in FIG. 11, the detecting unit 503 detects a critical path having the greatest cumulative delay (greatest delay path) (step S1101). Then, the detecting unit 503 computes a probability density distribution of delay of the greatest delay path (step S1102). The detecting unit 503 detects x number of critical paths having cumulative delays within the probability density distribution, and the critical-path detecting process proceeds to step S1003 shown in FIG. 10.

Figure 12:
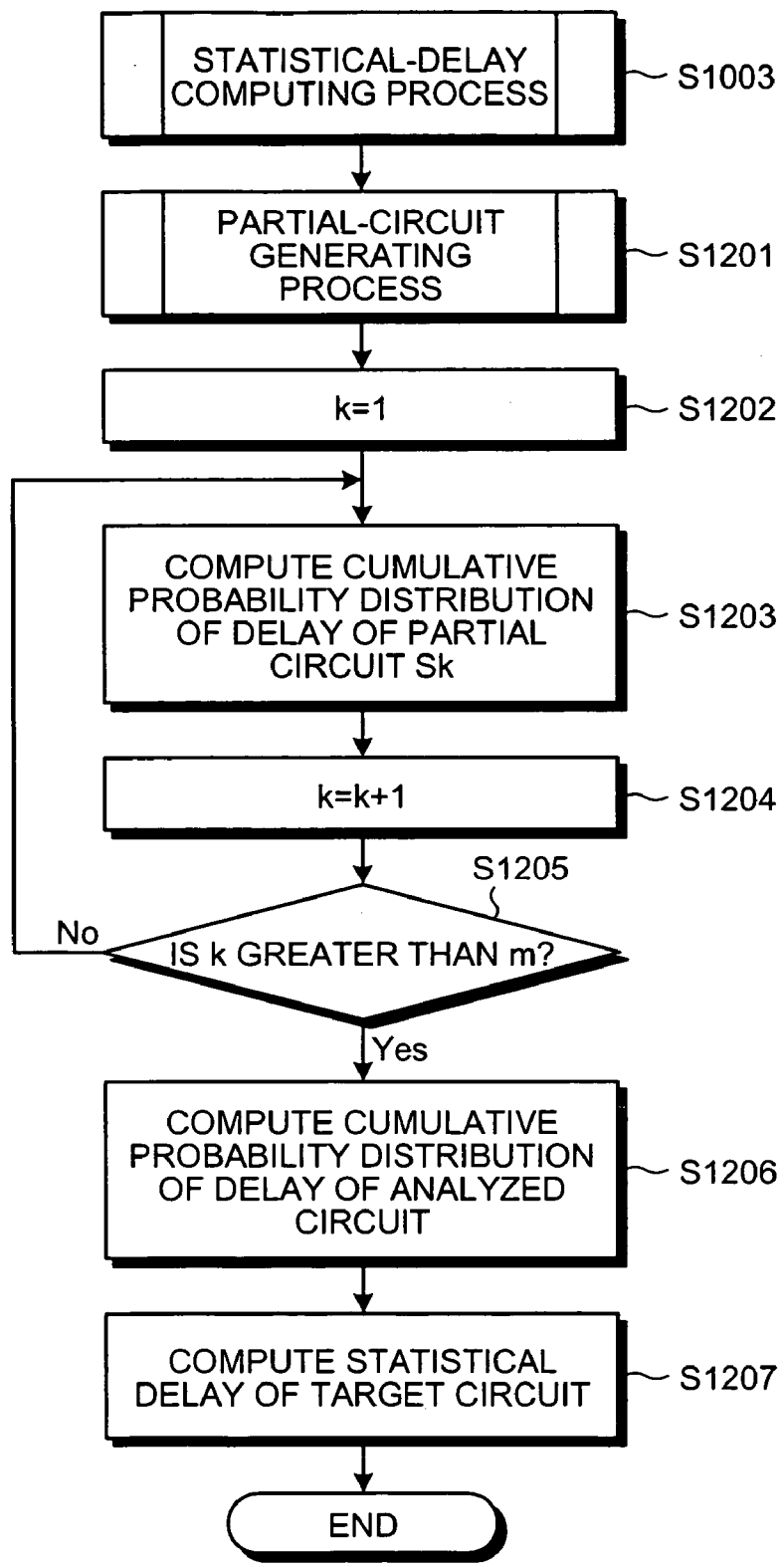
FIG. 12 is a flowchart of a statistical-delay computing process in the delay analysis device.

FIG. 12 is a flowchart of the statistical-delay computing process. As shown in FIG. 12, the generating unit 504 executes a partial-circuit generating process (step S1201). Assuming k=1 (step S1202), the cumulative-probability-distribution computing unit 505 computes the cumulative probability distribution of a partial circuit Sk (step S1203).

The statistical-delay computing unit 506 increments k (step S1204) and determines whether k is greater than m (step S1205) where m is the total number of partial circuits Sk. If k is not greater than m ("NO" at step S1205), the statistical-delay computing process returns to step S1203 and the cumulative-probability-distribution computing unit 505 computes the cumulative probability distribution of delay of the partial circuit Sk. If k is greater than m ("YES" at step S1205), the cumulative-probability-distribution computing unit 505 computes the cumulative probability distribution of delay of the target circuit 300 (step S1206), and based on the cumulative probability distribution of delay of the target circuit 300, computes the statistical delay of the target circuit 300 (step S1207).

Figure 13:
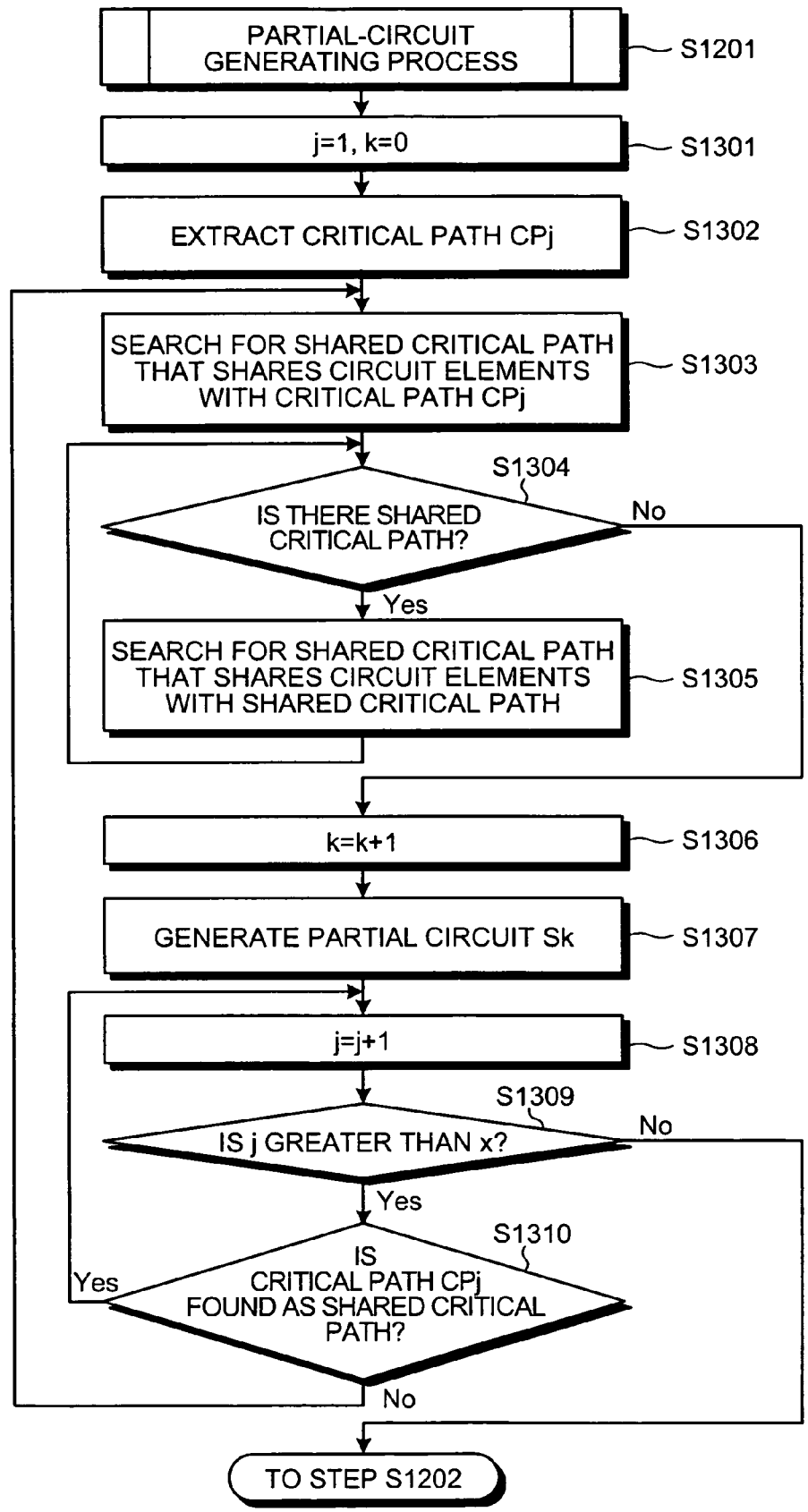
FIG. 13 is a flowchart of a partial-circuit generating process in the delay analysis device.

FIG. 13 is a flowchart of the partial-circuit generating process. As shown in FIG. 13, assuming j=1 and k=0 (step S1301), the generating unit 504 extracts a critical path CPj from x number of critical paths that are detected by the detecting unit 503 (step S1302). The generating unit 504 searches for a critical path (shared critical path) that shares circuit elements with the critical path CPj (step S1303).

If a shared critical path is found ("YES" at step S1304), the generating unit 504 searches for a critical path (shared critical path) that shares circuit elements with the found shared critical path (step S1305), and the partial-circuit generating process returns to step S1304. If a shared critical path is not found ("NO" at step S1304), the generating unit 504 increments k (step S1306) and generates a partial circuit Sk (step S1307). The partial circuit Sk includes the circuit elements that form the critical path CPj and the circuit elements that form the shared critical path.

Then, the generating unit 504 increments j (step S1308), and determines if j is greater than x (step S1309). If j is greater than x ("YES" at step S1309), the generating unit 504 determines whether the critical path CPj is found as a shared critical path (step S1310). If the critical path CPj is found as the shared critical path ("YES" at step S1310), the partial-circuit generating process returns to step S1308, and the generating unit 504 further increments j.

If the critical path CPj is not found as the shared critical path (NO" at step S1310), the partial-circuit generating process returns to step S1303, and the generating unit 504 searches a critical path (shared critical path) that shares circuit elements with the critical path CPj. If j is not greater than x (NO" at step 1309), the partial-circuit generating process proceeds to step S1202 shown in FIG. 12.

According to the embodiment described above, a target circuit to be analyzed that has critical paths can be reconfigured as a cluster of partial circuits that include only the circuit elements forming the critical paths. Thus, the circuit elements that are not related to the critical paths are excluded from analysis object, thereby speeding up the analyzing process.

In the above embodiment, the critical paths are detected based on the probability density distribution of the greatest delay path computed by the probability-density-distribution computing unit 502. However, x number of critical paths having cumulative delays within the probability density distribution may be detected only based on the timing list, thereby omitting the computing process by the probability-density-distribution computing unit 502 and speeding up the delay analyzing process.

As described above, with the delay analysis program, the recording medium that stores the delay analysis program, the delay analysis device, and the delay analysis method according to the present invention, circuit delay of a circuit can efficiently and accurately be analyze, thereby reducing the burden on a circuit designer and the designing time.

The delay analysis method explained in the present embodiment can be realized by executing a computer program prepared in advance using a computer such as a personal computer and a workstation. The computer program can be recorded on a computer-readable recording medium, such as a HD, a flexible disk, a CD-ROM, an MO disk, and a DVD, and read out by the computer from the recording medium to be executed. The program can also be a transmission medium that can be distributed via a network such as the Internet.

According to the embodiment described above, circuit delay of a circuit can be efficiently and accurately analyzed, thereby reducing the burden on a circuit designer and the designing time.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer-readable recording medium that stores therein a computer program for analyzing circuit delay, the computer program making a computer execute:
   receiving a result of a timing analysis of a target circuit to be analyzed;
   detecting, based on the result, critical paths having delays within a predetermined range; and
   computing a statistical delay of the target circuit based on a cumulative probability distribution of the delays of the critical paths.

2. The computer-readable recording medium according to claim 1, wherein the computer program further makes the computer execute
   computing a probability density distribution of delay of a critical path that has the greatest delay in the result, wherein
   the detecting includes detecting critical paths having delays within computed probability density distribution.

3. The computer-readable recording medium according to claim 1, wherein the detecting includes detecting, based on the result, critical paths ranked higher than a predetermined rank in an amount of delay.

4. The computer-readable recording medium according to claim 1, wherein the computer program further makes the computer execute:
   generating a partial circuit that forms a part of the target circuit, by detecting a critical path that shares circuit elements forming the target circuit, from among the critical paths detected at the detecting; and
   computing a cumulative probability distribution of delay of generated partial circuit, wherein
   the computing a statistical delay includes computing the statistical delay based on the cumulative probability distribution of the generated partial circuit.

5. A delay analysis device for analyzing circuit delay, comprising:
   a receiving unit configured to receive a result of a timing analysis of a target circuit to be analyzed;
   a detecting unit configured to detect, based on the result, critical paths having delays within a predetermined range; and
   a statistical-delay computing unit configured to compute a statistical delay of the target circuit based on a cumulative probability distribution of the delays of the critical paths.

6. The delay analysis device according to claim 5, further comprising
   a probability-density-distribution computing unit configured to compute a probability density distribution of delay of a critical path that has the greatest delay in the result, wherein
   the detecting unit is configured to detect critical paths having delays within computed probability density distribution.

7. The delay analysis device according to claim 5, wherein the detecting unit is configured to detect, based on the result, critical paths ranked higher than a predetermined rank in an amount of delay.

8. The delay analysis device according to claim 5, further comprising:
   a generating unit configured to generate a partial circuit that forms a part of the target circuit, by detecting a critical path that shares circuit elements forming the target circuit, from among the critical paths detected at the detecting; and a cumulative-probability-distribution computing unit configured to compute a cumulative probability distribution of delay of generated partial circuit, wherein the statistical-delay computing unit is configured to compute the statistical delay based on the cumulative probability distribution of the generated partial circuit.

9. A delay analysis method of analyzing circuit delay, comprising:

receiving a result of a timing analysis of a target circuit to be analyzed;

detecting, based on the result, critical paths having delays within a predetermined range; and computing a statistical delay of the target circuit based on a cumulative probability distribution of the delays of the critical paths.

10. The delay analysis method according to claim 9, further comprising computing a probability density distribution of delay of a critical path that has the greatest delay in the result, wherein the detecting includes detecting critical paths having delays within computed probability density distribution.

11. The delay analysis method according to claim 9, wherein the detecting includes detecting, based on the result, critical paths ranked higher than a predetermined rank in an amount of delay.

12. The delay analysis method according to claim 9, further comprising:

generating a partial circuit that forms a part of the target circuit, by detecting a critical path that shares circuit elements forming the target circuit, from among the critical paths detected at the detecting; and computing a cumulative probability distribution of delay of generated partial circuit, wherein the computing a statistical delay includes computing the statistical delay based on the cumulative probability distribution of the generated partial circuit.

\* \* \* \* \*